(12) United States Patent
Chen

(10) Patent No.: US 10,830,961 B2
(45) Date of Patent: Nov. 10, 2020

(54) OPTICAL FIBER SOUND PICKUP DEVICE AND METHOD FOR EQUIPMENT FOR MANUFACTURING THE SAME

(71) Applicant: BOE TECHNOLOGY GROUP CO., LTD., Beijing (CN)

(72) Inventor: Saihua Chen, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 141 days.

(21) Appl. No.: 16/119,614

(22) Filed: Aug. 31, 2018

(65) Prior Publication Data

US 2019/0082273 A1 Mar. 14, 2019

(30) Foreign Application Priority Data

Sep. 13, 2017 (CN) .......................... 2017 1 0822880

(51) Int. Cl.
*G02B 6/38* (2006.01)
*H04R 23/00* (2006.01)
(Continued)

(52) U.S. Cl.
CPC ........ *G02B 6/3845* (2013.01); *B29D 11/0074* (2013.01); *G01H 9/004* (2013.01);
(Continued)

(58) Field of Classification Search
CPC ...... H04R 23/008; H04R 7/24; H04R 31/003; H04R 1/46; G01H 9/004; G02B 6/3624;
(Continued)

(56) References Cited

U.S. PATENT DOCUMENTS 5,146,083 A 9/1992 Zuckerwar et al.
6,506,313 B1 * 1/2003 Fetterman ............ G01L 9/0077
216/24
(Continued)

FOREIGN PATENT DOCUMENTS

CN 101247678 * 8/2008 ............... G01H 9/00
CN 101247678 A 8/2008
(Continued)

OTHER PUBLICATIONS

First Chinese Office Action dated Nov. 28, 2018, received for corresponding Chinese Application No. 201710822880.4.

*Primary Examiner* — Michael P Mooney
(74) *Attorney, Agent, or Firm* — Kinney & Lange, P.A.

(57) ABSTRACT

In one embodiment, there is provided an optical fiber sound pickup device including: a housing having a substantially cylindrical structure; a vibration diaphragm mounted to an end face of a first side end of the housing; a ferrule including a main body of a substantially cylindrical shape, at least a part of the main body being mounted in the housing by cooperating with an inner wall of the housing, a head end of the main body that is close to the vibration diaphragm being separated from the vibration diaphragm by a distance; and an optical fiber fixedly extending through into the ferrule, a head face of the optical fiber being flush with an end face of the head end. A method and an equipment for manufacturing an optical fiber sound pickup device are also provided.

5 Claims, 2 Drawing Sheets

(51) Int. Cl.
*G02B 6/36* (2006.01)
*G01H 9/00* (2006.01)
*H04R 7/24* (2006.01)
*H04R 31/00* (2006.01)
*G01L 9/00* (2006.01)
*B29D 11/00* (2006.01)

(52) U.S. Cl.
CPC .......... *G01L 9/0077* (2013.01); *G02B 6/3624* (2013.01); *H04R 7/24* (2013.01); *H04R 23/008* (2013.01); *H04R 31/003* (2013.01)

(58) Field of Classification Search
CPC .. G02B 6/3845; G01L 9/0077; B29D 11/0074
USPC ................... 385/12–13, 15, 78, 91, 137, 139
See application file for complete search history.

(56) References Cited

U.S. PATENT DOCUMENTS

| | | | | |
|---|---|---|---|---|
| 6,820,488 B2 * | 11/2004 | Lenzing | ................ | G01L 9/0077 |
| | | | | 385/12 |
| 2003/0138185 A1 * | 7/2003 | Dianov | ................ | G01L 9/0079 |
| | | | | 385/12 |

FOREIGN PATENT DOCUMENTS

| CN | 101778328 | A | 7/2010 | | |
|---|---|---|---|---|---|
| CN | 101888578 | A | 11/2010 | | |
| CN | 104019884 | | * 9/2014 | ............ | H04R 31/00 |
| CN | 104019884 | A | 9/2014 | | |

* cited by examiner

OPTICAL FIBER SOUND PICKUP DEVICE AND METHOD FOR EQUIPMENT FOR MANUFACTURING THE SAME

CROSS-REFERENCE TO RELATED APPLICATION

This application claims priority to Chinese Patent Application No. 201710822880.4 filed on Sep. 13, 2017 in the State Intellectual Property Office of China, the disclosure of which is hereby incorporated by reference in its entirety.

TECHNICAL FIELD

The present disclosure relates to the field of a sound pickup device, and particularly, to an optical fiber sound pickup device, and a method and equipment for manufacturing the same.

BACKGROUND

In recent years, the measurement of human breath sounds has become a research hotspot. Many medical institutions and universities have carried out research on human respiratory sound measurement technology. Optical fiber FP (Fabry-Perot) cavity sound pickup device has become an important research direction in the field of respiratory sound measurement.

SUMMARY

According to an aspect of the present disclosure, there is provided an optical fiber sound pickup device comprising:
a housing having a substantially cylindrical structure;
a vibration diaphragm mounted to an end face of a first side end of the housing;
a ferrule comprising a main body of a substantially cylindrical shape, at least a part of the main body being mounted in the housing by cooperating with an inner wall of the housing, a head end of the main body that is close to the vibration diaphragm being separated from the vibration diaphragm by a distance; and
an optical fiber fixedly extending through into the ferrule, a head face of the optical fiber being flush with an end face of the head end.

In one embodiment, the ferrule further comprises a limiting stopper protruding radially outwardly from an outer peripheral surface of the main body, a side face of the limiting stopper being abutted against an end face of a second side end of the housing.

In one embodiment, the housing is made of non-metal material.

According to another aspect of the present disclosure, there is also provided a method for manufacturing an optical fiber sound pickup device, and the method comprises:
forming a housing having a substantially cylindrical structure;
forming a ferrule that comprises a main body of a substantially cylindrical shape and an axial through hole;
fixedly extending an optical fiber through into the axial through hole of the ferrule until a head face of the optical fiber is flush with an end face of the head end of the main body;
inserting the head end of the main body of the ferrule into the housing from a second side end of the housing until at least a part of the main body starting from the head end is positioned in the housing, to mount the main body in the housing; and
adjusting a vibration diaphragm to have a tension and then mounting the vibration diaphragm tensioned onto an end face of a first side end of the housing.

In one embodiment, the forming a ferrule that comprises a main body of a substantially cylindrical shape and an axial through hole, comprises: forming the ferrule that comprises the main body of the substantially cylindrical shape, a limiting stopper protruding radially outwardly from an outer peripheral surface of the main body, and the axial through hole; and
the inserting the head end of the main body of the ferrule into the housing from a second side end of the housing until at least a part of the main body starting from the head end is positioned in the housing, comprises: inserting the head end of the main body of the ferrule into the housing from the second side end of the housing until a side face of the limiting stopper is abutted against the end face of the second side end of the housing.

In one embodiment, the adjusting a vibration diaphragm to have a tension and then mounting the vibration diaphragm tensioned onto an end face of a first side end of the housing, comprises: adjusting the vibration diaphragm to have the tension; attaching, by using a light curing adhesive, the vibration diaphragm tensioned to the end face of the first side end of the housing; and light-curing the light curing adhesive.

In one embodiment, the method may further comprise:
cutting off, by using a laser, a portion of the vibration diaphragm that is positioned outside the end face of the first side end of the housing.

According to another aspect of the present disclosure, there is also provided an equipment for manufacturing an optical fiber sound pickup device, and the equipment comprises:
a bracket configured for fixation of an assembly of a housing and a ferrule, in which the housing has a substantially cylindrical structure, the ferrule comprises a main body of a substantially cylindrical shape and an axial through hole fixedly mounted with an optical fiber therein, and, at least a part of the main body is mounted in the housing by cooperating with an inner wall of the housing, to form the assembly;
a pair of vibration diaphragm winding rolls configured for respectively winding both ends of a vibration diaphragm thereon;
a tension adjuster configured for adjusting a portion of the vibration diaphragm that aims at an end face of a first side end of the housing and is positioned between the pair of vibration diaphragm winding rolls to have a tension so that the vibration diaphragm can be mounted to the end face of the first side end of the housing.

In one embodiment, the equipment may further comprise:
a curing light configured for light-curing a light curing adhesive after the vibration diaphragm tensioned is attached to the end face of the first side end of the housing by using the light curing adhesive.

In one embodiment, the equipment may further comprise:
a laser cutter configured for cutting off, by using a laser, a portion of the vibration diaphragm that is positioned outside the end face of the first side end of the housing.

DETAILED DESCRIPTION OF THE EMBODIMENTS

Various embodiments of the present disclosure will be described in detail below with reference to the accompanying drawings.

Figure 1:
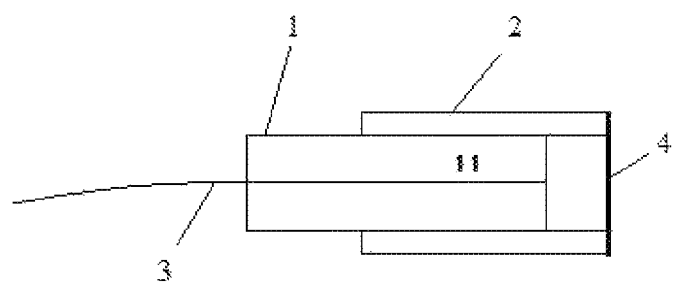
FIG. 1 is a schematic view showing a structure of an optical fiber sound pickup device according to an embodiment of the present disclosure.

FIG. 1 is a schematic view showing a structure of an optical fiber sound pickup device according to an embodiment of the present disclosure, illustrating a cross-section taken along a central axis of the optical fiber sound pickup device.

Referring to FIG. 1, in one embodiment of the present disclosure, an optical fiber sound pickup device comprises: a ferrule 1, a housing 2, an optical fiber 3 and a vibration diaphragm 4. The housing 2 has a substantially cylindrical structure, and the vibration diaphragm 4 is mounted to an end face of a first side end (right side end in FIG. 1) of the housing 2. The ferrule 1 includes a main body 11 of substantially cylindrical shape, at least a part of the main body 11 is mounted in the housing 2 by cooperating with an inner wall of the housing 2, and a head end of the main body 11 that is close to the vibration diaphragm 4 is separated from the vibration diaphragm 4 by a distance, to form a cavity serving as a FP (Fabry-Perot) cavity within housing 2 along this distance. The ferrule 1 has an axial through hole, the optical fiber 3 is extended through into the axial through hole so that it is mounted in the ferrule 1. A head face of the optical fiber that is at the head end of the main body 11 is flush with an end face of the head end. It should be noted that, the "substantially cylindrical structure" described in the present disclosure refers to a shape in which a hollow hole is internally defined, but its external form may adopt any suitable shape such as a circle, a square or a rectangle.

FIG. 1 shows a part of the main body 11 is mounted in the housing 2 by cooperating with an inner wall of the housing 2. However, the present disclosure is not limited thereto, and the main body 11 may be integrally positioned and mounted in the housing 2. As to the mounting manner between the main body 11 and the housing 2, for example, a threaded engagement, a bonding, a fitting, a frictional engagement, an interference fit, and the like may be used, and the present disclosure is not limited thereto.

With the technical solution according to the embodiments of the present disclosure, the structure of the optical fiber sound pickup device is greatly simplified, the manufacturing cost and the manufacturing efficiency are improved, and the mass production is facilitated, in addition, the measurement sensitivity of the optical fiber sound pickup device is ensured.

Figure 2:
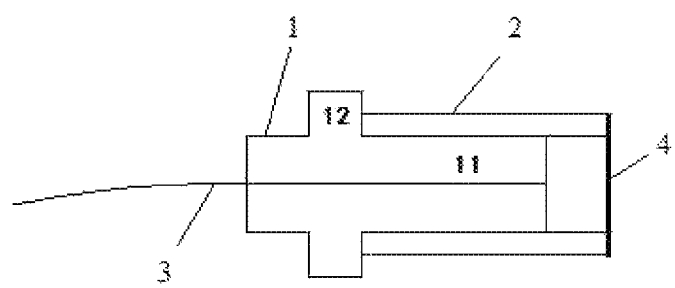
FIG. 2 is a schematic view showing a structure of an optical fiber sound pickup device according to another embodiment of the present disclosure.

FIG. 2 is a schematic view showing a structure of an optical fiber sound pickup device according to another embodiment of the present disclosure. The components and/or structures of the optical fiber sound pickup device according to the present embodiment are substantially the same as or similar to those mentioned in the foregoing embodiments except what will be described below.

Referring to FIG. 2, in this embodiment of the present disclosure, the ferrule 1 may further comprise the main body 11 and a limiting stopper 12, and the limiting stopper 12 protrudes radially outwardly from an outer peripheral surface of the main body 11. The limiting stopper 12 can be used for limiting a length of the part of the main body 11 extending into the housing 2, and the limiting function is achieved by abutting a side face of the limiting stopper 12 against an end face of a second side end (left side end in FIG. 2) of the housing 2.

As an alternative, the limiting stopper can also be embodied as an annular continuous groove or discontinuous grooves on the outer peripheral surface of the main body 11, while forming a radially inwardly projected annular protrusion or separated protrusions on the inner wall of the second side end of the housing 2. The mounting and the limit of the ferrule 1 can be achieved simultaneously by embedding the protrusion(s) of the housing 2 into the groove(s) of the main body 11. Of course, other limiting structures/configuration can be used in other embodiments, and are not limited herein.

In this embodiment of the present disclosure, the housing 2 may be made of a non-metal material. The non-metal material, for example, may be a material with a low coefficient of thermal expansion such as ceramic, glass or the like, which helps to reduce the effect of temperature drift on the pickup device.

Figure 3:
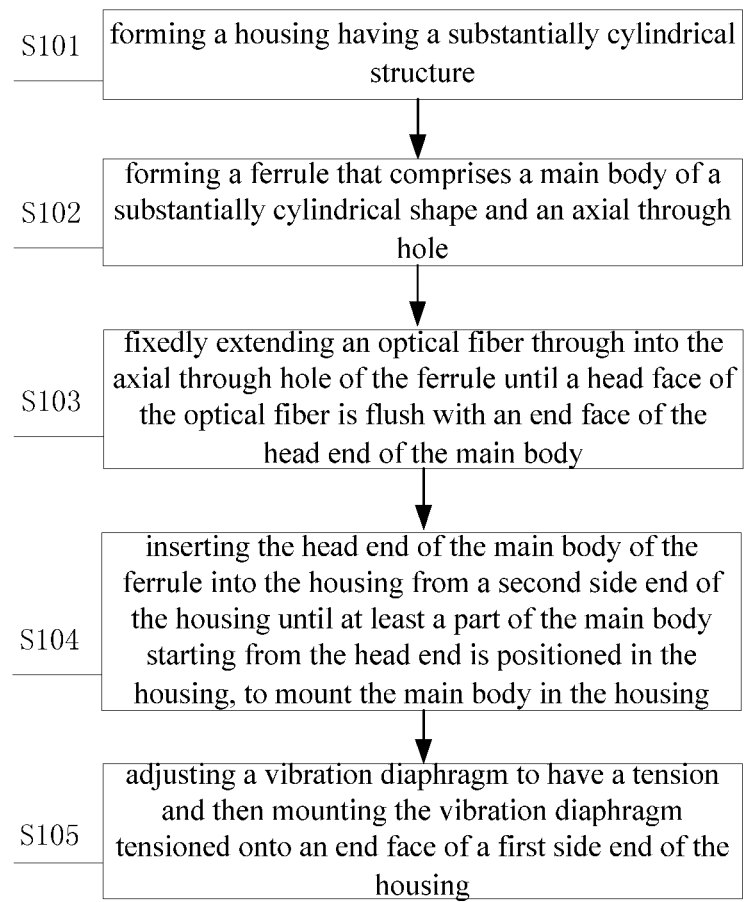
FIG. 3 is a schematic flow diagram showing a method for manufacturing an optical fiber sound pickup device according to an embodiment of the present disclosure.

FIG. 3 is a schematic flow diagram showing a method for manufacturing an optical fiber sound pickup device according to an embodiment of the present disclosure.

Referring to FIG. 3, in one embodiment of the present disclosure, there is provided a method for manufacturing an optical fiber sound pickup device, and the method comprises the following steps.

A step S101 is to form a housing having a substantially cylindrical shape.

The housing may be made of a non-metal material having a low coefficient of thermal expansion. According to the requirements of the mounting or the limit, an annular protrusion or separated protrusions may be formed at the inner wall of one side end of the housing, as an alternative, the housing may be formed to have an inner diameter smaller than the outer diameter of the ferrule main body, as another alternative, a thread may be formed on the inner wall of the housing, and the like.

A step S102 is to form a ferrule that comprises a main body of substantially cylindrical shape and an axial through hole.

The ferrule may be made of, for example, ceramic, and an axial through hole of a corresponding size is formed at the axis of the ferrule depending on the diameter of an optical fiber. According to the requirements of the fixing or the limit, a groove may be formed on the outer peripheral surface of the main body of the ferrule, or a thread may be formed on the outer peripheral surface of the main body of the ferrule, or the like.

A step S103 is to fixedly extend an optical fiber through into the axial through hole of the ferrule until a head face of the optical fiber is flush with an end face of the head end of the main body.

The optical fiber can be inserted into the axial through hole from a tail end of the ferrule, and go out of a head end of the ferrule (i.e., the head end of the main body). Then, a part of the optical fiber that has been out of the head end of the ferrule is cut off along a plane where end face of the head end of the ferrule is in, so that a head face of the optical fiber is flush with the end face of the head end of the ferrule.

A step S104 is to insert the head end of the main body of the ferrule into the housing from a second side end of the housing until at least a part of the main body starting from the head end is positioned in the housing, to mount the main body in place in the housing.

This step is to insert the head end of the main body of the ferrule into the housing so that the part of the main body starting from the head end is positioned and mounted in the housing. The mounting manner can be for example an interference fit, an embedding fit, a screwing, or the like.

A step S105 is to adjust a vibration diaphragm to have a tension and then mount the vibration diaphragm tensioned onto an end face of a first side end of the housing.

After implementing the step S104, in an assembly of the ferrule and the housing, there is a cavity formed between the head end of the ferrule and the end face of the first side end (namely, the other side end, opposing to the side end where the ferrule is inserted into the housing) of the housing. After the vibration diaphragm is adjusted to have a tension and then is mounted onto the end face of the first side end of the housing, the cavity, serving as an optical fiber FP cavity, is formed between a reflecting surface of the vibration diaphragm and the end face, where the head face of the optical fiber is in, of the head end of the ferrule.

In the embodiments of the present disclosure, the above-mentioned tension may be determined based on the diameter of the housing. As an example, the value of the abovementioned tension may be, for example, in the range of about 30N to about 100N.

With the above manufacturing method according to the embodiments of the present disclosure, the manufacturing cost and the manufacturing efficiency are improved, and the mass production is facilitated, in addition, the measurement sensitivity of the optical fiber sound pickup device is ensured.

In another embodiment of the present disclosure, the step S102 of forming a ferrule that comprises a main body of substantially cylindrical shape and an axial through hole, may further comprise forming a limiting stopper (see the limiting stopper 12 shown in FIG. 2) protruding radially outwardly from the outer peripheral surface of the main body. Moreover, in the step S104, the head end of the main body of the ferrule is inserted into the housing from the second side end of the housing until a side face of the limiting stopper is abutted against the end face of the second side end of the housing, as a result, at least the part of the main body starting from the head end is positioned in the housing. Other implementations of the limiting stopper may be adopted by referring to the forgoing, and the detailed description is omitted here.

According to an embodiment of the present disclosure, the mounting the vibration diaphragm tensioned onto an end face of a first side end of the housing, may comprise: attaching, by using a light curing adhesive, the vibration diaphragm to the end face of the first side end of the housing; and then, light-curing the light curing adhesive. As a result, the vibration diaphragm is fixed to the end face of the first side end of the housing by using the light curing adhesive. The light curing adhesive has a fast curing speed of between about 20 s and about 30 s.

In the embodiments of the present disclosure, after the vibration diaphragm is fixed to the end face of the first side end of the housing, a portion of the vibration diaphragm that is positioned outside the end face of the first side end of the housing may be cut off by using a laser. By cutting the vibration diaphragm with a laser, no stress is generated during the cutting process, which effectively ensures that the vibration diaphragm is not damaged and improves the manufacturing efficiency of the optical fiber sound pickup device.

Figure 4:
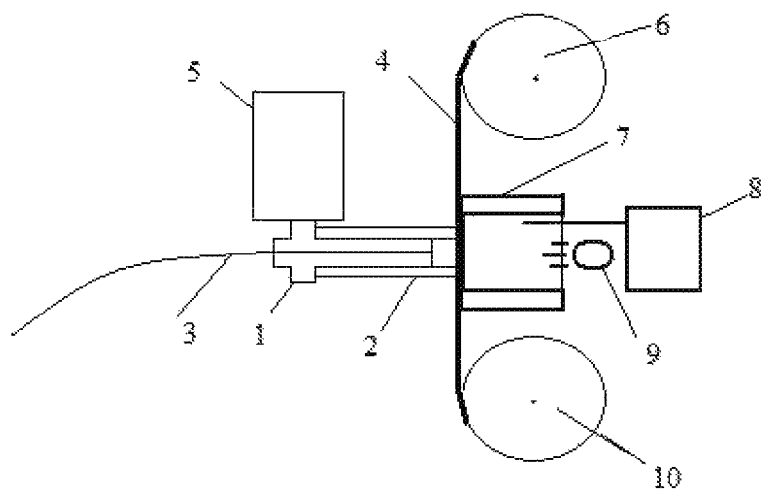
FIG. 4 is a schematic view showing a structure of an equipment for manufacturing an optical fiber sound pickup device according to an embodiment of the present disclosure.

FIG. 4 is a schematic view showing a structure of an equipment for manufacturing an optical fiber sound pickup device according to an embodiment of the present disclosure.

Referring to FIG. 4, in one embodiment of the present disclosure, an equipment for manufacturing an optical fiber sound pickup device comprises: a bracket 5, a pair of vibration diaphragm winding rolls 6 and 10, and a tension adjuster 7.

The bracket 5 is configured for fixation of an assembly of a housing 2 and a ferrule 1. In this assembly, the housing 2 has a substantially cylindrical structure, the ferrule 1 comprises a main body of substantially cylindrical shape and an axial through hole fixedly mounted with an optical fiber 3 therein, and, at least a part of the main body is mounted in the housing 2 by cooperating with an inner wall of the housing 2.

The pair of vibration diaphragm winding rolls 6 and 10 are wound respectively with both ends of vibration diaphragm 4. One vibration diaphragm winding roll is provided on either side of the free end (namely the first side end) of the housing 2, such that a portion of the vibration diaphragm 4 bridging between the pair of vibration diaphragm winding rolls 6 and 10 is aimed at the free end of the housing 2.

The tension adjuster 7 is configured for adjusting the portion of the vibration diaphragm that bridges between the pair of vibration diaphragm winding rolls 6 and 10 and aims at an end face of the free end of the housing 2 to have a tension so that the vibration diaphragm 4 tensioned can be mounted to the end face of the first side end of the housing 2.

With the manufacturing equipment according to the embodiments of the present disclosure, the mounting and the tensioning of the vibration diaphragm is achieved by mechanical automation method, the manufacturing cost is decreased and the manufacturing efficiency of the optical fiber sound pickup device is improved, and the mass production is facilitated, in addition, the measurement sensitivity of the optical fiber sound pickup device is ensured.

In an embodiment of the present disclosure, referring to FIG. 4, the manufacturing equipment may further comprise a curing light 9 configured for light-curing a light curing adhesive after the vibration diaphragm 4 tensioned is attached to the end face of the first side end of the housing 2 by using the light curing adhesive. The light curing adhesive can be applied to the vibration diaphragm 4 or the end face of the first side end of the housing 2 by a glue applicator. As a result, the vibration diaphragm is fixed to the end face of the first side end of the housing by using the light curing adhesive under irradiation of the curing light 9. The light curing adhesive has a fast curing speed of between about 20 s and about 30 s.

In an embodiment of the present disclosure, referring to FIG. 4, the manufacturing equipment may further comprise a laser cutter 8 configured for cutting off a portion of the vibration diaphragm 4 that is positioned outside the end face of the first side end of the housing 2. By cutting the vibration diaphragm 4 with a laser, no stress is generated during the cutting process, which effectively ensures that the vibration diaphragm 4 is not damaged and improves the manufacturing efficiency of the optical fiber sound pickup device.

Although some embodiments of the present disclosure have been shown and described as above, the embodiments described are merely exemplary and are not intended to limit the present disclosure. Changes and modifications of the above-described embodiments may be made by those skilled in the art without departing from the scope of the present disclosure, and all such changes and modifications fall into the scope of the present disclosure.

What is claimed is:

1. A method for manufacturing an optical fiber sound pickup device, the method comprising:
   forming a housing having a substantially cylindrical structure;
   forming a ferrule that comprises a main body of a substantially cylindrical shape and an axial through hole;
   fixedly extending an optical fiber into the axial through hole of the ferrule until a head face of the optical fiber is flush with an end face of the head end of the main body;
   inserting the head end of the main body of the ferrule into the housing from a second side end of the housing until at least a part of the main body starting from the head end is positioned in the housing, to mount the main body in the housing;
   adjusting a vibration diaphragm to have a tension and then mounting the tensioned vibration diaphragm onto an end face of a first side end of the housing; and
   light-curing a light curing adhesive after the vibration diaphragm tensioned is attached to the end face of the first side end of the housing by using the light curing adhesive;
   wherein forming a ferrule that comprises a main body of a substantially cylindrical shape and an axial through hole comprises: forming the ferrule that comprises the main body of the substantially cylindrical shape, a limiting stopper protruding radially outwardly from an outer peripheral surface of the main body, and the axial through hole; and
   wherein inserting the head end of the main body of the ferrule into the housing from a second side end of the housing until at least a part of the main body starting from the head end is positioned in the housing comprises: inserting the head end of the main body of the ferrule into the housing from the second side end of the housing until a side face of the limiting stopper is abutted against the end face of the second side end of the housing.

2. The method of claim 1, wherein adjusting a vibration diaphragm to have a tension and then mounting the tensioned vibration diaphragm onto an end face of a first side end of the housing, comprises:
   adjusting the vibration diaphragm to have the tension; and
   attaching, by using a light curing adhesive, the tensioned vibration diaphragm to the end face of the first side end of the housing.

3. The method of claim 1, further comprising:
   cutting off, by using a laser, a portion of the vibration diaphragm that is positioned outside the end face of the first side end of the housing.

4. An equipment for manufacturing an optical fiber sound pickup device, the equipment comprising:
   a bracket configured for fixation of an assembly of a housing and a ferrule, in which the housing has a substantially cylindrical structure, the ferrule comprises a main body of a substantially cylindrical shape, an axial through hole fixedly mounted with an optical fiber therein, and a limiting stopper protruding radially outwardly from an outer peripheral surface of the main body, a side face of the limiting stopper being abutted against an end face of a second side end of the housing, and, at least a part of the main body is mounted in the housing by cooperating with an inner wall of the housing, to form the assembly;
   a pair of vibration diaphragm winding rolls configured for respectively winding both ends of a vibration diaphragm thereon;
   a tension adjuster configured for adjusting a portion of the vibration diaphragm that aims at an end face of a first side end of the housing and is positioned between the pair of vibration diaphragm winding rolls to have a tension so that the vibration diaphragm can be mounted to the end face of the first side end of the housing; and
   a curing light configured for light-curing a light curing adhesive after the vibration diaphragm tensioned is attached to the end face of the first side end of the housing by using a light curing adhesive.

5. The equipment of claim 4, further comprising:
   a laser cutter configured for cutting off, by using a laser, a portion of the vibration diaphragm that is positioned outside the end face of the first side end of the housing.

* * * * *